US009736671B2

(12) United States Patent
Adinarayan et al.

(10) Patent No.: US 9,736,671 B2
(45) Date of Patent: Aug. 15, 2017

(54) DATA USAGE RECOMMENDATION GENERATOR

(71) Applicant: International Business Machines Corporation, Armonk, NY (US)

(72) Inventors: Geetha Adinarayan, Bangalore (IN); Shaw-Ben Shi, Austin, TX (US); Gandhi Sivakumar, Bentleigh (AU); Meng Hong Tsai, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/997,717

(22) Filed: Jan. 18, 2016

(65) Prior Publication Data

US 2017/0208446 A1    Jul. 20, 2017

(51) Int. Cl.
| | |
|---|---|
| *H04M 11/00* | (2006.01) |
| *H04W 4/26* | (2009.01) |
| *H04M 15/00* | (2006.01) |
| *H04W 4/24* | (2009.01) |

(52) U.S. Cl.
CPC ............ *H04W 4/26* (2013.01); *H04M 15/88* (2013.01); *H04W 4/24* (2013.01)

(58) Field of Classification Search
CPC .......... H04W 4/26; H04W 4/24; H04M 15/88
(Continued)

(56) References Cited

U.S. PATENT DOCUMENTS 6,366,780 B1 * 4/2002 Obhan ................. H04W 16/00
370/329

7,415,038 B2 * 8/2008 Ullmann ............. H04L 41/0213
370/468
(Continued)

FOREIGN PATENT DOCUMENTS

WO    2015057880 A1    4/2015

OTHER PUBLICATIONS

"Data Usage Awareness in Provisioning Media Content", An IP.com Prior Art Database Technical Disclosure, Authors et. al.: Disclosed Anonymously, IP.com No. 000229487, Publication Date: Jul. 31, 2013, 4 pages, <http://ip.com/IPCOM/000229487>.
(Continued)

*Primary Examiner* — Khai M Nguyen
(74) *Attorney, Agent, or Firm* — Nathan M. Rau

(57) ABSTRACT

The method include receiving, by one or more computer processors, a request for data usage, the request for data usage being associated with a mobile device. The method further includes identifying, by one or more computer processors, a current data usage quantity, the current data usage quantity being associated with the mobile device. The method further includes determining, by one or more computer processors, whether the current data usage quantity is beyond a threshold data usage. The method further includes responsive to the data usage quantity being beyond the threshold data usage, receiving, by one or more computer processors, mobile device information associated with the mobile device. The method further includes analyzing, by one or more computer processors, the mobile device information. The method further includes determining, by one or more computer processors, access for the request based on the mobile device information and the current data usage quantity.

20 Claims, 3 Drawing Sheets

(58) Field of Classification Search
USPC .......... 455/405, 406, 403; 379/111, 13
See application file for complete search history.

(56) References Cited

U.S. PATENT DOCUMENTS

| | | | |
|---|---|---|---|
| 8,219,062 B2 | 7/2012 | Bandera et al. | |
| 8,577,329 B2 | 11/2013 | Momtahan et al. | |
| 8,886,749 B2 | 11/2014 | Kim et al. | |
| 2010/0017506 A1* | 1/2010 | Fadell | H04M 15/00 709/224 |
| 2011/0151831 A1* | 6/2011 | Pattabiraman | H04L 12/14 455/405 |
| 2011/0276442 A1* | 11/2011 | Momtahan | G06Q 30/00 705/30 |
| 2012/0173363 A1 | 7/2012 | Soroca et al. | |
| 2012/0272227 A1* | 10/2012 | Liu | H04L 67/34 717/168 |
| 2013/0172041 A1 | 7/2013 | Garg et al. | |
| 2013/0346624 A1 | 12/2013 | Chervets et al. | |
| 2015/0065085 A1* | 3/2015 | Sheikh Naziruddin | H04M 15/7652 455/406 |

OTHER PUBLICATIONS

"Intelligent Analytics Solution for Mobile Data", An IP.com Prior Art Database Technical Disclosure, Authors et. al.: Disclosed Anonymously, IP.com No. 000241519, Publication Date: May 8, 2015, 7 pages, <http://ip.com/IPCOM/000241519>.

"Method and System to invoke mobile application data communication actions based on analytics of network environment, financial impact and security posture", An IP.com Prior Art Database Technical Disclosure, Authors et. al.: Disclosed Anonymously, IP.com No. 000231066, Publication Date: Sep. 25, 2013, 5 pages, <http://ip.com/IPCOM/000231066>.

"My Data Manager—Track your mobile data usage and save money", by Mobidia Technology, available on the iTunes App Store, 2 pages, printed on Nov. 12, 2015, © 2015 Mobidia Technology, <https://itunes.apple.com/us/app/my-data-manager/id477865384>.

"Onavo Extend", by Onavo, Inc., available on the iTunes App Store, 3 pages, printed on Nov. 12, 2015, Copyright © 2011-2014 Onavo Mobile Ltd., <https://itunes.apple.com/us/app/onavo-data-usage-get-more/id423545287>.

"Onavo Count—Data Usage", Android Apps on Google Play, 2 pages, printed on Nov. 12, 2015, © 2015 Google, <https://play.google.com/store/apps/details?id=com.onavo.android.onavoid>.

"Why You Don't Need Third Party Apps to Manage Background Data Use in Android Jelly Bean", 13 pages, printed on Nov. 12, 2015, <http://www.makeuseof.com/tag/why-you-dont-need-third-party-apps-to-manage-background-data-use-in-android-jelly-bean/>.

\* cited by examiner

DATA USAGE RECOMMENDATION GENERATOR

BACKGROUND

The present invention relates generally to the field of cellular networks and more particularly to data usage.

A cellular network or mobile network is a communication network where the last link is wireless. Mobile and other computing devices access cellular networks in order to perform actions and functions, such as accessing the Internet, communicating, or viewing content. When a computing device accesses a cellular network the computing device uses data. Providers of cellular networks often restrict the amount of data a particular computing device can use during any period of time. Users of computing devices may have difficulty monitoring data usage to avoid exceeding these data usage thresholds.

SUMMARY

Aspects of the present invention disclose a method, computer program product, and system for determining data usage access. The method include receiving, by one or more computer processors, a request for data usage, the request for data usage being associated with a mobile device. The method further includes identifying, by one or more computer processors, a current data usage quantity, the current data usage quantity being associated with the mobile device. The method further includes determining, by one or more computer processors, whether the current data usage quantity is beyond a threshold data usage. The method further includes responding to the data usage quantity being beyond the threshold data usage, by receiving, by one or more computer processors, mobile device information associated with the mobile device. The method further includes analyzing, by one or more computer processors, the mobile device information. The method further includes determining, by one or more computer processors, access for the request based on the mobile device information and the current data usage quantity.

DETAILED DESCRIPTION

Figure 1:
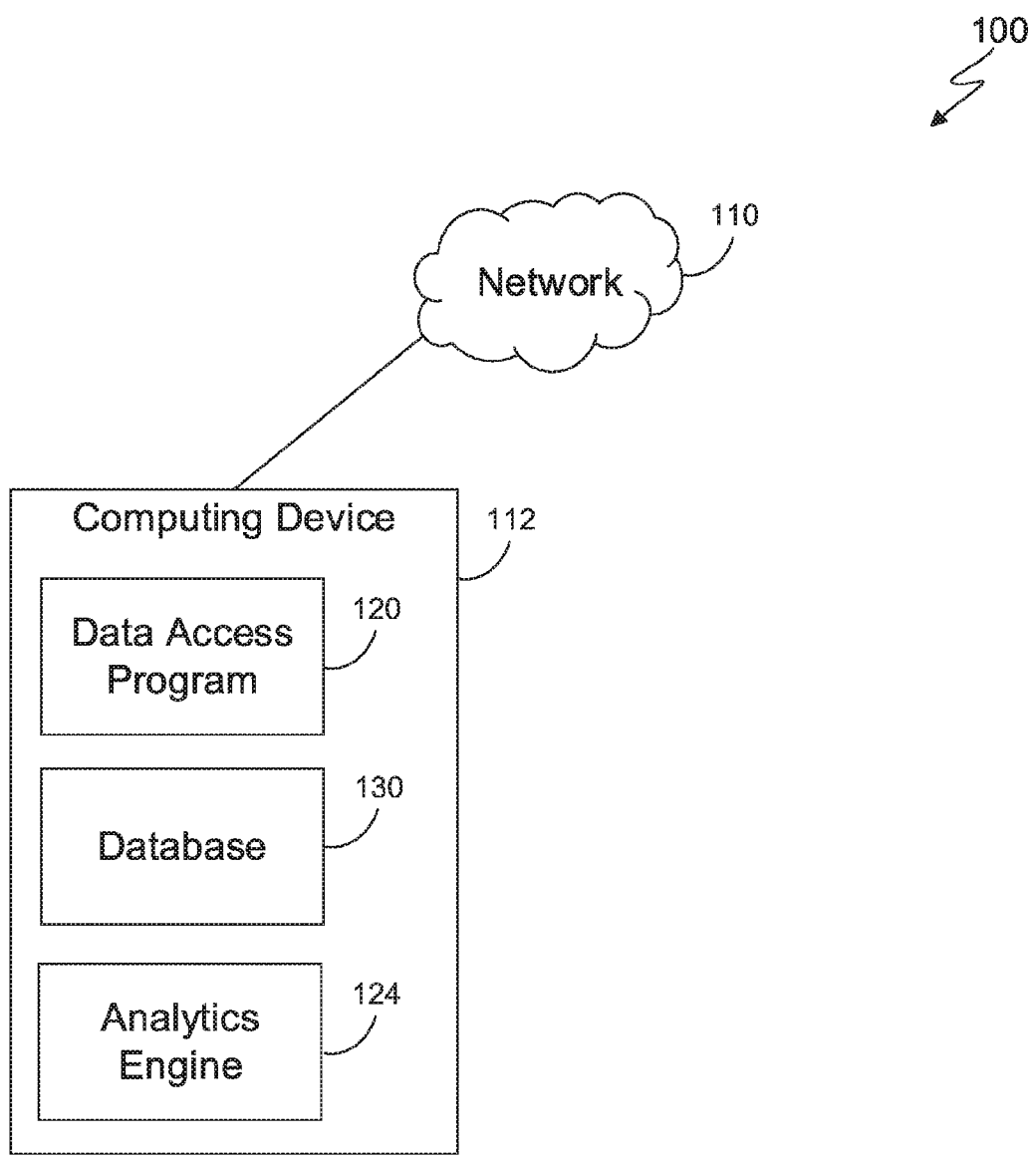
FIG. 1 is a block diagram of a computing environment suitable for operation of a data access program, in accordance with at least one embodiment of the present invention.

FIG. 1 is a block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention.

The distributed data processing environment 100 includes a computing device 112 communicating with a network 110. The network 110 represents, for example, a telecommunications network, a local area network (LAN), a wide area network (WAN), such as the Internet, or a combination of the three, and includes wires, wireless, and/or fiber optic connections. Network 110 includes one or more wired and/or wireless networks that are capable of receiving and transmitting data, voice, and/or video signals, including multimedia signals that include voice, data, and video information.

In the depicted embodiment, the computing device 112 is one or more of a management server, a web server, a client device, or any other electronic device or computing system capable of receiving, generating, and sending data. In some embodiments, the computing device 112 is a computing system utilizing multiple computers as a server and/or client system, such as in a cloud computing environment. In some embodiments, the computing device 112 is a laptop, a tablet computer, a netbook computer, a personal computer (PC), a desktop computer, a personal digital assistant (PDA), a smart phone, or any programmable electronic device capable of communicating with another computing device (not depicted) via the network 110. In other embodiments, the computing device 112 is a computing system utilizing clustered computers and components to act as a single pool of seamless resources. The computing device 112 may include components as depicted and described in further detail with respect to FIG. 3, in accordance with embodiments of the present invention. The computing device 112 includes a data access program 120, a database 130, and an analytics engine 124.

The analytics engine 124 is a software program capable of receiving input, generating results, and communicating the results with the data access program 120. In some embodiments, the analytics engine 124 is an engine for cognitive computing. In some embodiments, the analytics engine 124 is a general purpose analytics engine. In other embodiments, the analytics engine 124 operates on a model tailored to data access programs (e.g., data access program 120). The analytics engine 124 may be configured for finding and analyzing patterns and efficiencies at the macro level, understood in the context of data usage and access systems. In various embodiments, the analytics engine 124 may be a function of data access program 120. In an example, data access program 120 may have multiple functions or models, one of which may be the analytics engine 124.

In the depicted embodiment, the analytics engine 124 resides on the computing device 112. In other embodiments, the analytics engine 124 may reside elsewhere in the distributed data processing environment 100, such as within another computing device (not illustrated), a server device (not illustrated), or a client device (not illustrated). In some embodiments, the data access program 120 is the analytics engine 124.

In the depicted embodiment, the database 130 resides on the computing device 112. In another embodiment, the database 130 may reside elsewhere in the distributed data processing environment 100, such as within another computing device, a server device, a client device, or as a standalone database that is capable of communicating with the computing device 112 via the network 110. The database 130 is an organized collection of data. The Database 130 is implemented with any type of storage device capable of storing data that is accessed and utilized by the computing device 112, such as a database server, a hard disk drive, or a flash memory. In some embodiments, the database 130 represents multiple storage devices within the computing device 112. The database 130 stores information related to the computing device 112, such as the computing device 112's data usage history, data usage plan, data usage limit, application usage, location, times associated with activity, user preset threshold data limits, and other information relevant to the usage of the computing device 112, such as availability of the network 110, type of connection available via the network 110, and signal strength of the network 110.

In the depicted embodiment, the data access program 120 resides on the computing device 112. In another embodiment, the data access program 120 may reside elsewhere in the distributed data processing environment 100, such as within another computing device, a server device, or a client device that is capable of communicating with the computing device 112 via the network 110. In some embodiments, the data access program 120 receives information from the computing device 112, the database 130, and the analytics engine 124. In some embodiments, the data access program 120 may reside on a server device and communicate with a corresponding data access program client device (not illustrated). In such an embodiment, the data access program client device may reside on a computing device, such as the computing device 112. In such an embodiment, the data access program 120 may receive information from the data access program client device. For example, the data access program 120 may reside on a server device and receive information, such as user history, data usage, and other client device information, from an application on a cellular phone.

Figure 2:
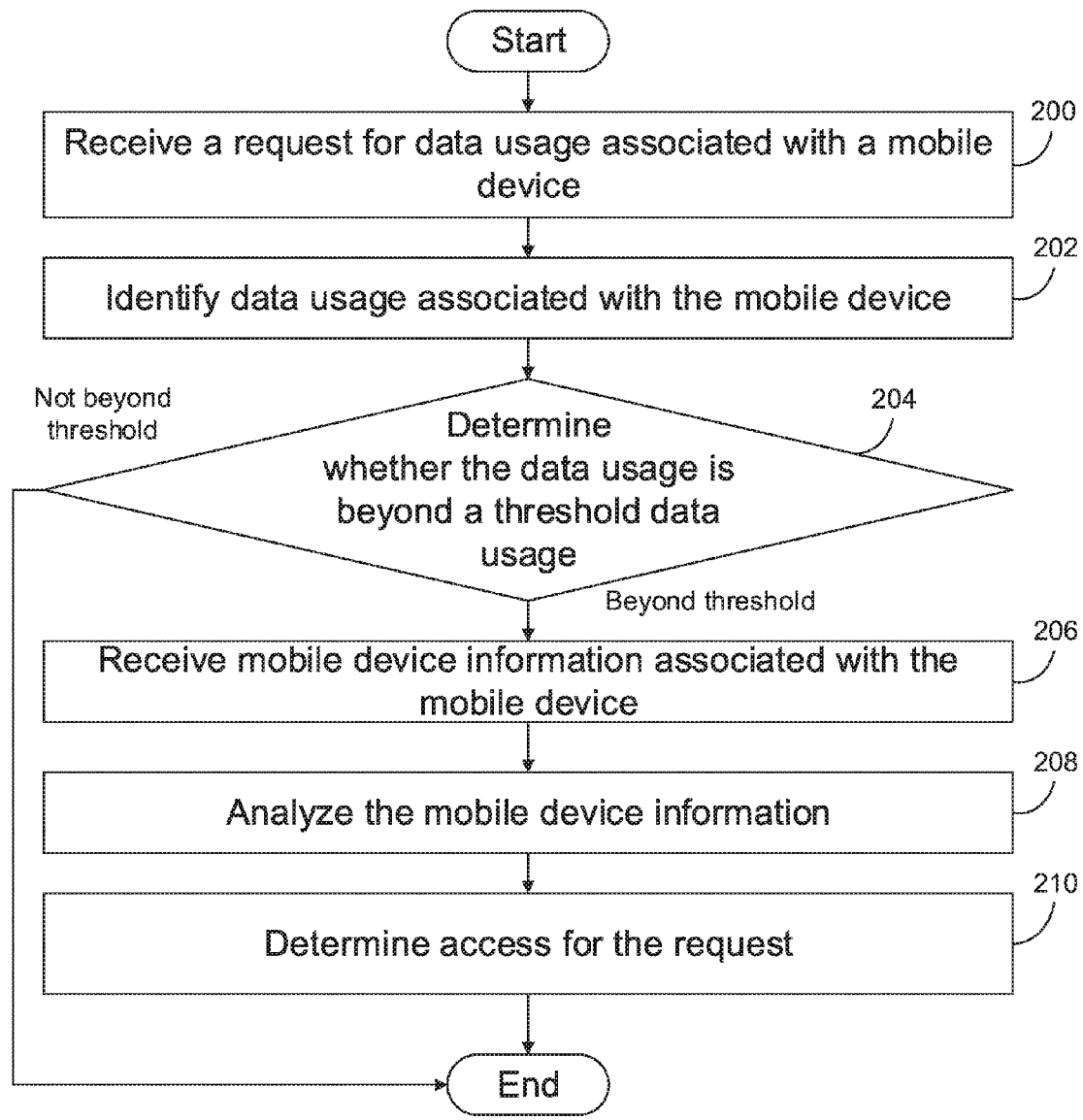
FIG. 2 is a flowchart depicting operational steps for a data access program, in accordance with at least one embodiment of the present invention.

FIG. 2 is a flowchart depicting operational steps for the data access program 120, in accordance with at least one embodiment of the present invention. In some embodiments, the operational steps for the data access program 120 are initiated when a computing device is turned on. In other embodiments, the operational steps for the data access program are initiated when the data access program 120 receives a request for data usage associated with a computing device. In some embodiments, the operational steps for the data access program 120 may be initiated responsive to input from a user.

At step 200, the data access program 120 receives a request for data usage associated with a mobile device, such as the computing device 112. Data usage refers to digital information the computing device 112 uses when accessing the cellular network. Actions requiring the computing device 112 to access a cellular network require the computing device 112 to use data. Data usage may be measured in units of digital information, such as bytes. Certain actions use more data than other actions. For example, streaming a video requires the computing device 112 to use more data than making a phone call. In some embodiments, each time the computing device 112 begins performing an action that uses data, the data access program 120 may receive the request for data usage. For example, the computing device 112 receives a request for data usage when the computing device 112 opens an email or a social media application. The request for data usage may include meta-information about the request. For example, the request for data usage may include a time associated with when the request is made, a location associated with where the request is made, or the type of request being made.

At step 202, the data access program 120 identifies data usage associated with the mobile device. The data usage is associated with the computing device 112. Data usage for the computing device 112 may be measured and/or tracked as a total for the lifespan of the device, in real time, or incremental totals (e.g., monthly, weekly, periodically, etc.).

In some embodiments, the data access program 120 may identify the data usage within a database, such as the database 130. In some embodiments, the database 130 may store data information for the computing device 112 incrementally. For example, a data usage for the computing device 112 may be determined every week, and a log of data usage may be stored within the databased 130. In some embodiments, the database 130 may store a record of each action performed by the computing device 112 and the data usage associated with each of the actions. In such an embodiment, the data access program 120 may calculate the data usage by adding the data usage stored within the database 130. In such an embodiment, the data access program 120 may calculate the data usage by adding the data usage stored within the database 130 for a particular time period, such as for a current month or for a current billing period. In some embodiments, the data access program 120 may identify data usage from a user profile. For example, a user may set up a profile that identifies different applications he or she uses. In such an example, the data access program 120 may identify data usage from the profile.

At step 204, the data access program 120 determines whether the data usage is beyond a threshold data usage. The threshold data usage may be predetermined based on a subscription plan. For example, a user of a mobile phone may pay ten dollars a month for one gigabyte of data usage. In such an embodiment, one gigabyte of data usage per month is the threshold data usage. In other embodiments, a user may predetermine the threshold. The threshold data usage may be stored in a database that is capable of communicating with the data access program 120, such as the database 130. The data access program 120 may determine whether the data usage is beyond the threshold data usage by comparing the two values to see which has a greater value. If, no, the data usage is not beyond the threshold data usage, the data access program 120 exits. If, yes, the data usage is beyond the threshold data usage, the data access program 120 proceeds to step 206.

In some embodiments, the data access program 120 may determine the threshold data usage based on information stored within the database 130. In some embodiments the analytics engine 124 may determine the threshold data usage based on information stored within the database 130. For example, the analytics engine 124 may determine the threshold data usage based on a predetermined amount set by a subscription plan in addition to mobile data use history. For example, if a subscription plan sets a limit at twenty gigabytes of data and a user has a history utilizing large amounts of data in a short period of time (e.g., streaming videos) the threshold data usage may be that 18 gigabytes are allotted. If, however, the user has a history of only utilizing small increments of data over time (e.g., 0.1 gigabytes per day) the threshold data usage may be 19.8 gigabytes.

In some embodiments, the threshold data usage is based on a percentage of usage of a total data usage for a billing cycle of a wireless subscription plan. For example, a subscription plan may set a twenty gigabytes of data limit for a billing cycle. In such an example, the threshold data usage may be ninety percent of the twenty gigabytes of data limit.

At step 206, the data access program 120 receives mobile device information associated with the mobile device. The mobile device information is associated with the computing device 112 and may be stored within the database 130. The mobile device information includes at least one artefact selected from the group consisting of: a timestamp, a location of a mobile device, a current data usage, a data usage history of the mobile device, a signal strength of the mobile device, a network connection availability of the mobile device, and a mobile device application usage trail.

The computing device information may include information about time, a location for the computing device 112, current data usage for the computing device 112, data usage associated with the request, strength of the network 110's signal(s), type of the network 110's signals (wireless, cellular, etc.), a log of data usage history for the computing device 112, or a mobile device application usage trail.

Information about time may be a timestamp for when the request is made. Information about time may also include timestamps for similar requests. For example, information about time may be that the computing device 112 always accesses a social media website at or around 4 p.m. Information about time may also be how long a data using action has lasted in the past. For example, information about time may be that the computing device 112 typically spends ten minutes checking email or two hours streaming videos.

Information about location may be a location for where the request is made. For example, location information may be that the computing device 112 is at a particular address. Location information may also include predetermined and/or pre-identified frequent locations. For example, a user of the computing device 112 may indicate that a specific location is his or her home or his or her place of employment. Location information may include that the location where the request is being made is a new location, or one the computing device 112 has never been to before. Location information may include information about the location, such as whether the location is a restaurant, a shopping center, a hospital, etc.

Current data usage for the computing device 112 may be associated with the data usage threshold. For example, current data usage may be the amount of data that has been used for the current month, period, or billing cycle. Current data usage may also include information about the type of data that has been used over the past month. For example, whether data was used to make phone calls, download videos, etc.

Data usage associated with the request from step 200 may be based on previous actions taken by the computing device 112. For example, if the request is to access a social media website, and the computing device 112 typically uses one megabyte of data each time the social media website is accessed, the data usage associated with the request to access the social media website may be one megabyte of data. In other embodiments, data usage associated with the request may vary based on time spent performing the action. For example, if the request is to stream episodes of a television show, information about the request may be that one hour of streaming will use one megabyte of data and two hours of streaming will use two megabytes of data, etc. In such an example, the data access program 120 may indicate to a user of the computing device 112 information indicating that the data used for the request will vary based on the time spent performing the action.

Strength of the network signal may include information about how easily the computing device 112 is able to access the network 110. For example, in certain areas, access to a network is difficult based on proximity of available cellular towers and networks. In such an example, strength of network signal may include a measurement of current signal strength. Strength of signal information may also include current location information. For example, the current signal strength may be low due to weather at the current location, or due to the current location being a tunnel.

Type of network signal available may include information about the type of network the network 110 provides the computing device 112. In some embodiments, the network 110 provides multiple possible connections, such as a wireless or a cellular signal. Type of network signal available may include current location information. For example, the type of network signal available may include that wireless access is restricted for the computing device 112 or that wireless access is available at a nearby location.

A mobile device application usage trail is a grouping of commands, programs, and functions that have historically occurred together or in proximity. For example, a mobile device application usage trail may include that using a camera application is shortly followed by using an editing software within a social media website.

At step 208, the data access program 120 analyzes the mobile device information. In some embodiments, the analysis involves the data access program 120 sending computing device information to the analytics engine 124, the analytics engine 124 analyzing the computing device information, and the data access program 120 receiving analyzed computing device information.

The analytics engine 124 may analyze the computing device information based on a static and/or dynamic process correlating the request received at step 200. For example, the analytics engine 124 may be a big data analytics engine. Big data analytics is a process of analyzing and examining large volumes of data to discover patterns, correlations, and other information about the data. Big data analytics analyzes higher volumes of data than conventional analytics and business intelligence solutions would analyze. For example, the big data analytics engine may access two hundred million pages of structured and unstructured content consuming over four terabytes of disk storage. Big data analytics may include predictive analytics. Predictive analytics encompasses statistical techniques such as predictive modeling, machine learning, and data mining to analyze current and historical facts to make predictions about future, or otherwise unknown, events. The analytics engine 124 may identify patterns, correlation, and trends within the computing device information. The analytics engine 124 may use the patterns, correlations, and trends within the computing device information to extrapolate or predict further actions based on the request and the computing device information. The analytics engine 124 may analyze the computing device information using high-performance data mining, predictive analytics, machine learning, natural language processing, text mining, text analysis, forecasting, and/or optimization.

For example, the analytics engine 124 may analyze time information to determine a pattern of data accessing behavior. For example, the analytics engine 124 may identify that a user checks his or her email around 8:00 a.m. every morning. In such an example the analytics engine 124 may identify the user checking his or her email around 8:00 a.m. every morning as a pattern of behavior.

In another example, the analytics engine 124 may analyze mobile device information to determine how much data a particular request will require. For example, the analytics engine 124 may use information about user history to determine how much data a particular request will require. In such an example, the analytics engine 124 may determine if a user typically streams videos for several hours at a time using approximately five gigabytes of data each time, the analytics engine 124 may determine that a request for streaming a video will use five gigabytes of data. In another example the analytics engine 124 may use information about location. For example, the analytics engine 124 may identify that at certain locations a request uses more data than the same request would at another location due to the poor quality of network cellular reception. In another example, the analytics engine 124 may use time information. In such an example, the analytics engine 124 may identify the late afternoon as a high traffic time for a particular cellular phone application, and that the high traffic slows the server for the particular cellular phone application, in turn causing a request to use more data than that same request would at an earlier or later time.

In another example, the analytics engine may 124 analyze information about location. For example, the analytics engine 124 may identify that a first time a user travels to a location, he or she accesses a map on his or her computing device, but does not use a map during subsequent visits. The analytics engine 124 may also identify that a user downloads a weather report for a location approximately one hour before leaving towards the location. In such an example, the analytics engine 124 may identify a conditional pattern of behavior such that if a user downloads a weather report for a location the user has not previously visited the user will access a map in approximately an hour.

In some embodiments, the analytics engine 124 may identify these patterns based on input from a computer programmer. For example, a computer programmer may identify potential patterns for the analytics engine 124 to look for. In other embodiments, the analytics engine may compare information from regular time intervals, such as daily or weekly, looking for similarities and differences, and/or compare information from different locations looking for similarities and differences.

At step 210, the data access program 120 determines access for the request. The request was received at step 200. The access is whether or not, and the manner by which, the computing device 112 should perform the request for data usage. In some embodiments, access is allowing the request. In other embodiments, access is prohibiting the request.

In some embodiments, access is based on whether or not a user would be required to purchase additional data as a part of his or her subscription plan. For example, access may always be prohibited if additional data must be purchased to perform a request. In another embodiment, access may be prohibited unless a user is in a new location and downloading a map. In another embodiment, access may be prohibited unless a user manually overrides the prohibition.

In other embodiments, access is deferring the request. For example, the data access program 120 may identify a time for the request indicating a new billing cycle within a monthly subscription plan is about to begin. In such an example, the data access program 120 may determine that the request should be deferred. In another embodiment, the data access program 120 may identify a location for the computing device 112 and identify that the computing device 112 is near a location with access to a wireless network (e.g., one block from home) and defer the request until the computing device 112 is at the location with access to the wireless network. In another example, the data access program 120 may identify that a user will enter a new billing cycle in one day and defer the request until the user and the computing device 112 are in a new billing cycle.

In another example, the data access program 120 may defer access to a social media site because the data access program 120 has determined the social media site is a lower priority activity (as opposed to making phone calls, accessing maps, or checking emails). Such a prioritization may be based on user input, input from a program developer, or a feature of the data access program 120. For example, the data access program 120 may identify certain activities as having a higher priority based on the time of day the activities are typically performed. For example, activities performed between the hours of 8:30 a.m. and 12:00 p.m. may be ranked as having a higher priority than activities performed between the hours of 12:00 p.m. and 1:00 p.m. Deferring the request may be done so that the request is completed at a future time such as when the computing device 112 has access to a wireless network.

In other embodiments, access includes congesting the request. Congesting the request may include making adjustments to the manner in which the request is carried out such that the action uses less data. For example, the request may be to view a video via a web browser within the computing device 112. The data access program 120 may display the video with a lower quality. In another example, the request may be to view a web page with images and graphics embedded within the web page. The data access program 120 may act by displaying the web page without the images and graphics such that the web page only contains plain text. Congesting the request may be done so that the request uses less data than it would otherwise use. The data access program 120 may analyze previous requests similar to the request for data usage and compare data usage between requests of lower quality or with fewer images.

In other embodiments, access is prefetching the request. The data access program 120 may identify within the data usage history that a computing device 112 uses several social media websites during a morning commute. In such an embodiment, the data access program 120 may download content for the social media websites when the computing device 112 has access to a wireless network, such as when the computing device 112 is at home or at a train station. In the previous example, where a user downloads weather information one hour before downloading map information if the user has never been to the location, prefetching the request may be downloading the map at a time earlier than when the user attempts to download the map, such as while the weather information is being downloaded if the computing device 112 has access to a wireless network at the time the weather information is downloaded. Prefetching the request may be done so that the request and/or a predicted future request does not use data since the request was completed when the computing device 112 had access to a wireless network.

In some embodiments, the data access program 120 has access to functions and applications within the computing device 112. In such embodiments, the data access program 120 may allow access based on determinations made at step 204 automatically. For example, the data access program 120 may automatically download a video with lower quality or pre-fetch content from a social media website. In some embodiments, the data access program 120 may generate an alert indicating the type of access for a particular request and display the alert via the computing device 112.

Figure 3:
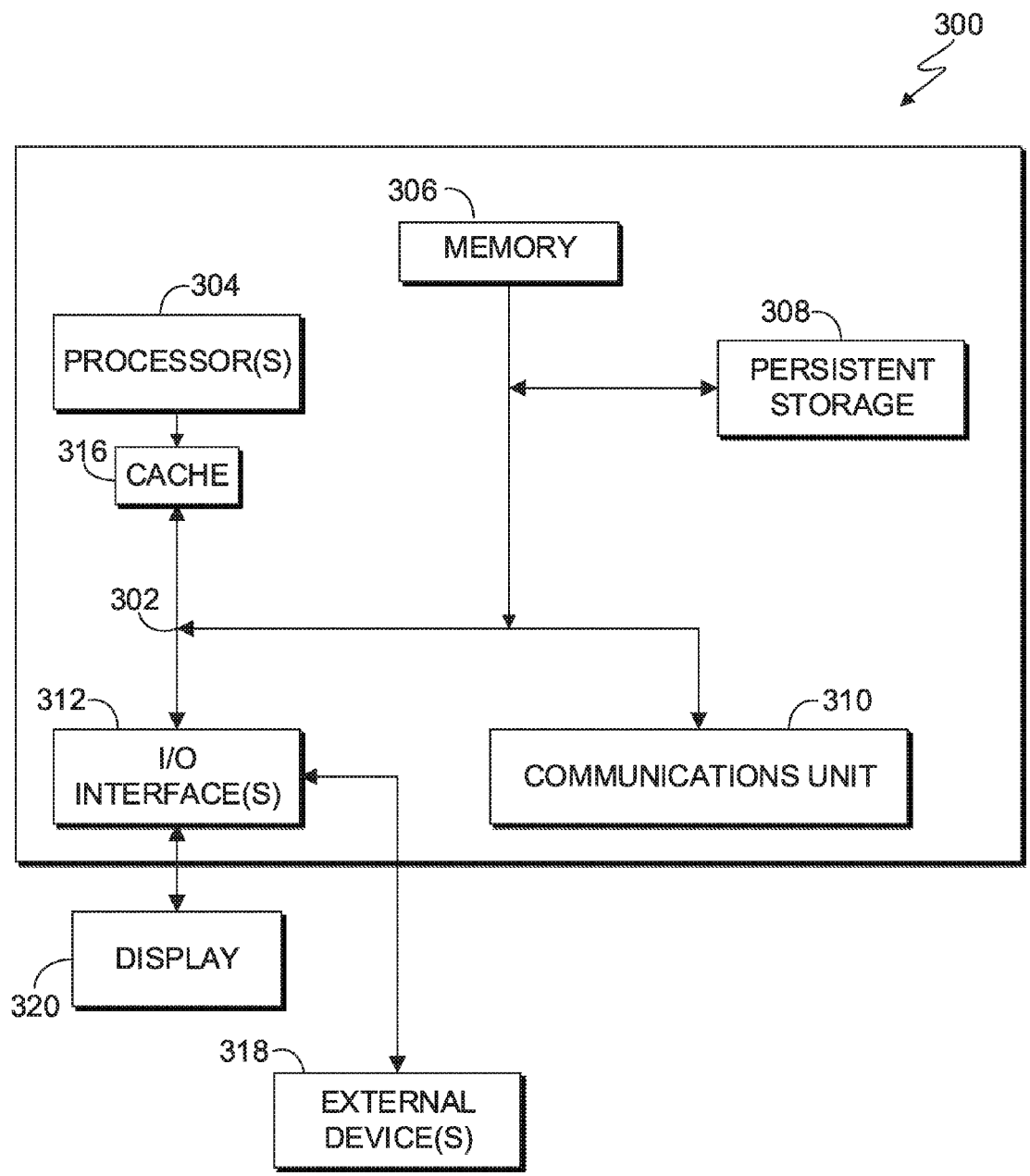
FIG. 3 is a block diagram of components of a computing apparatus suitable for executing a data access program, in accordance with at least one embodiment of the present invention.

FIG. 3 is a block diagram depicting components of a computer 300 suitable for executing the data access program 120. In some embodiments the computer 300 is the computing device 112. FIG. 3 displays the computer 300, the one or more processor(s) 304 (including one or more computer processors), the communications fabric 302, the memory 306, the RAM 316, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g., microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the data access program 120 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. The data access program 120 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining data usage access, the method comprising:
   receiving, by one or more computer processors, a request for data usage, said request for data usage associated with a mobile device;
   identifying, in response to the request for data usage, by said one or more computer processors, a current data usage quantity, said current data usage quantity associated with said mobile device;
   determining, by said one or more computer processors, whether said current data usage quantity is beyond a threshold data usage;
   responsive to said data usage quantity being beyond said threshold data usage, receiving, by one or more computer processors, mobile device information associated with said mobile device;
   analyzing, by an analytics engine, said analytics engine operated by said one or more computer processors, said mobile device information; and
   determining, by said one or more computer processors, access for said request based on said mobile device information and said current data usage quantity, wherein said access is determined without further interaction from a user.

2. The method of claim 1, wherein said mobile device information comprises at least one artefact selected from the group consisting of:
   (a) a timestamp;
   (b) a location of said mobile device;
   (c) said current data usage;
   (d) a data usage history of said mobile device;
   (e) a signal strength of said mobile device;
   (f) a network connection availability of said mobile device; and
   (g) a mobile device application usage trail.

3. The method of claim 1, wherein said access is selected from the group consisting of:
   (a) allowing said request;
   (b) prohibiting said request;
   (c) deferring said request; and
   (d) congesting said request.

4. The method of claim 1, wherein said threshold data usage is based on a percentage of usage of a total data usage allotted for a billing cycle according to a wireless subscription plan.

5. The method of claim 1, wherein analyzing, by one or more computer processors, said mobile device information is based on mobile device information utilizing big data analytics.

6. The method of claim 1, wherein said access comprises prefetching, by said one or more computer processors, said request when said mobile device is utilizing wireless connectivity.

7. The method of claim 6, wherein prefetching, by one or more computer processors, said request comprises:
   receiving, by said one or more computer processors, data usage history;
   analyzing, by said analytics engine, said data usage history to yield a pattern of data usage activity; and downloading, by said one or more computer processors, content based on said pattern of data usage activity prior to receiving said request.

8. A non-transitory computer program product for determining data usage access, the computer program product comprising:
one or more computer readable storage media and program instructions stored on said
one or more computer readable storage media, said program instructions comprising:
program instructions to receive a request for data usage, said request for data usage being associated with a mobile device;
program instructions to identify a current data usage quantity, said current data usage quantity being associated with said mobile device;
program instructions to identify a type of network connection associated with the requested data usage;
program instructions to determine whether said current data usage quantity for the identified type of network connection is beyond a threshold data usage;
responsive to said data usage quantity being beyond said threshold data usage, program instructions to receive mobile device information associated with said mobile device:
program instructions to analyze said mobile device information; and
program instructions to determine access for said request based on said mobile device information and said current data usage quantity, wherein said access is determined without further interaction from a user.

9. The computer program product of claim 8, wherein said mobile device information is at least one of: a timestamp; a location of said mobile device; said current data usage; a data usage history of said mobile device; a signal strength of said mobile device; a network connection availability of said mobile device; and a mobile device application usage trail.

10. The computer program product of claim 8, wherein said access is at least one of:
allowing said request; prohibiting said request; deferring said request; and congesting said request.

11. The computer program product of claim 8, wherein said threshold data usage is based on a percentage of usage of a total data usage allotted for a billing cycle of a wireless subscription plan.

12. The computer program product of claim 8, wherein program instructions to analyze said mobile device information is based on mobile device information utilizing big data analytics.

13. The computer program product of claim 8, wherein said access comprises program instructions to prefetch said request when said mobile device is utilizing wireless connectivity.

14. The computer program product of claim 13, wherein instructions to prefetch said request comprises program instructions to:
receive data usage history;
analyze said data usage history to yield a pattern of data usage activity; and download content based on said pattern of data usage activity prior to receiving said request.

15. A computer system for determining data usage access, the computer system comprising:
one or more computer processors;
one or more computer readable storage media;
computer program instructions; and
said computer program instructions being stored on said computer readable storage media for execution by at least one of said one or more processors, said computer program instructions comprising:
program instructions to receive a request for data usage, said request for data usage being associated with a mobile device;
program instructions to identify a current data usage quantity, said current data usage quantity being associated with said mobile device;
program instructions to determine whether said current data usage quantity is beyond a threshold data usage, wherein the threshold data usage is determined at least based on a historical analysis of data usage for the mobile device in data increments over a period of time;
responsive to said data usage quantity being beyond said threshold data usage, program instructions to receive mobile device information associated with said mobile device:
program instructions to analyze said mobile device information; and
program instructions to determine access for said request based on said mobile device information and said current data usage quantity, wherein said access is determined without further interaction from a user.

16. The computer system of claim 15, wherein said mobile device information is at least one of: a timestamp, a location of said mobile device, said current data usage, a data usage history of said mobile device, a signal strength of said mobile device, a network connection availability of said mobile device, and a mobile device application usage trail.

17. The computer system of claim 15, wherein said access is at least one of: allowing said request, prohibiting said request, deferring said request, and congesting said request.

18. The computer system of claim 15, wherein said threshold data usage is based on a percentage of usage of a total data usage allotted for a billing cycle of a wireless subscription plan.

19. The computer system of claim 15, wherein program instructions to analyze said mobile device information is based on mobile device information utilizing big data analytics.

20. The computer system of claim 15, wherein said access comprises program instructions to prefetch said request when said mobile device is utilizing wireless connectivity.

* * * * *